March 22, 1960　　J. E. BOUGHTWOOD ET AL　　2,929,875
TRANSMISSION TEST APPARATUS

Filed Dec. 19, 1957　　10 Sheets-Sheet 1

INVENTORS
J. E. BOUGHTWOOD
A. BOGGS
T. A. CHRISTIE
BY
ATTORNEY

March 22, 1960  J. E. BOUGHTWOOD ET AL  2,929,875
TRANSMISSION TEST APPARATUS
Filed Dec. 19, 1957  10 Sheets-Sheet 2
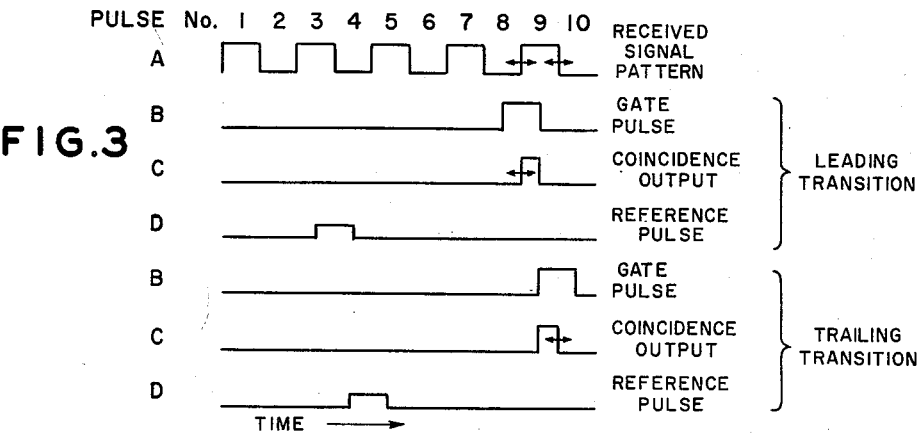
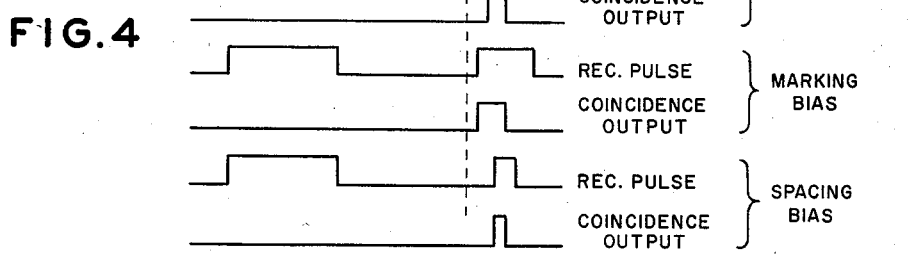
FIG. 5
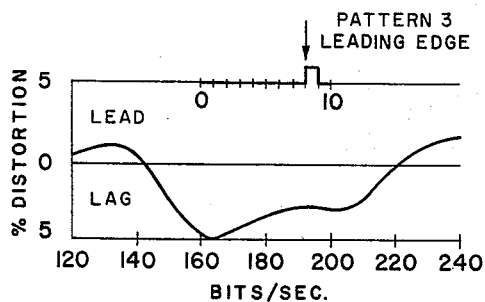
FIG. 6
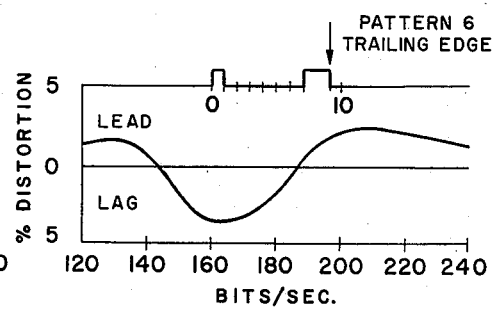
TYPICAL CHARACTERISTIC
DISTORTION CURVES
INVENTORS
J. E. BOUGHTWOOD
A. BOGGS
BY T. A. CHRISTIE
ATTORNEY

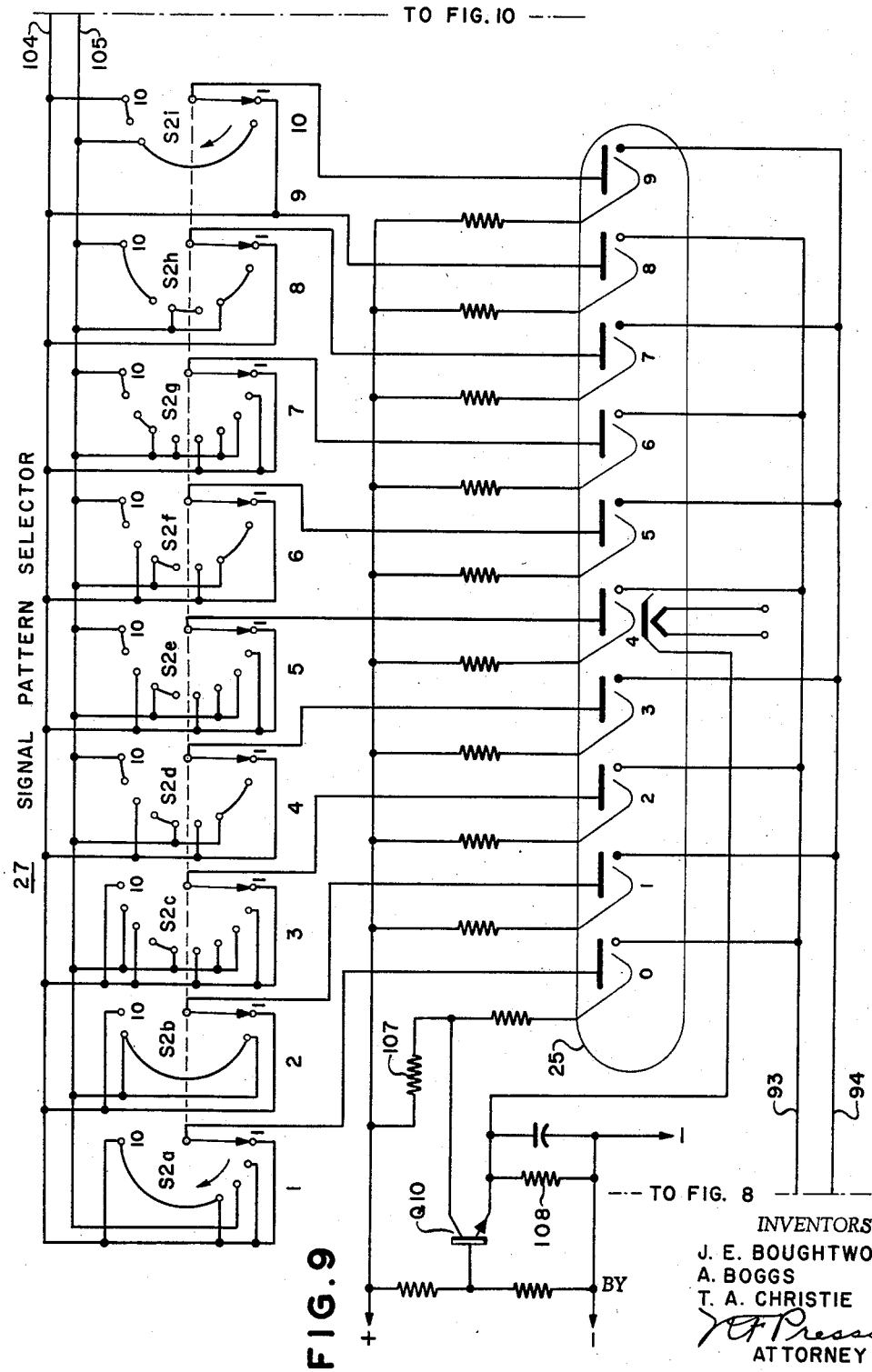

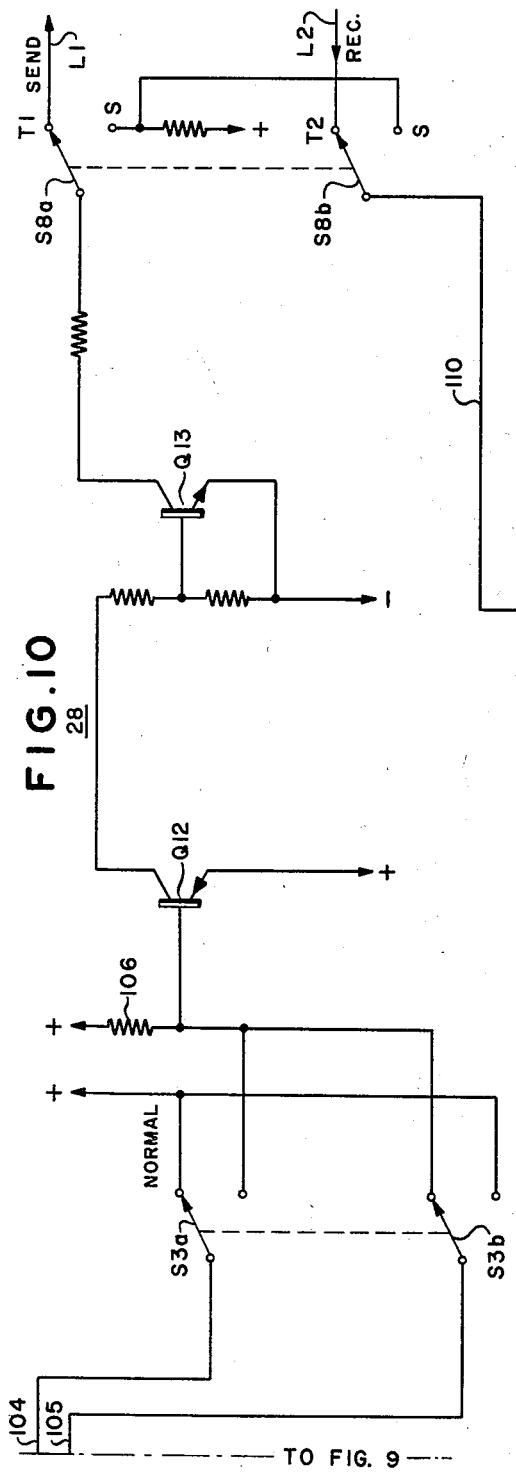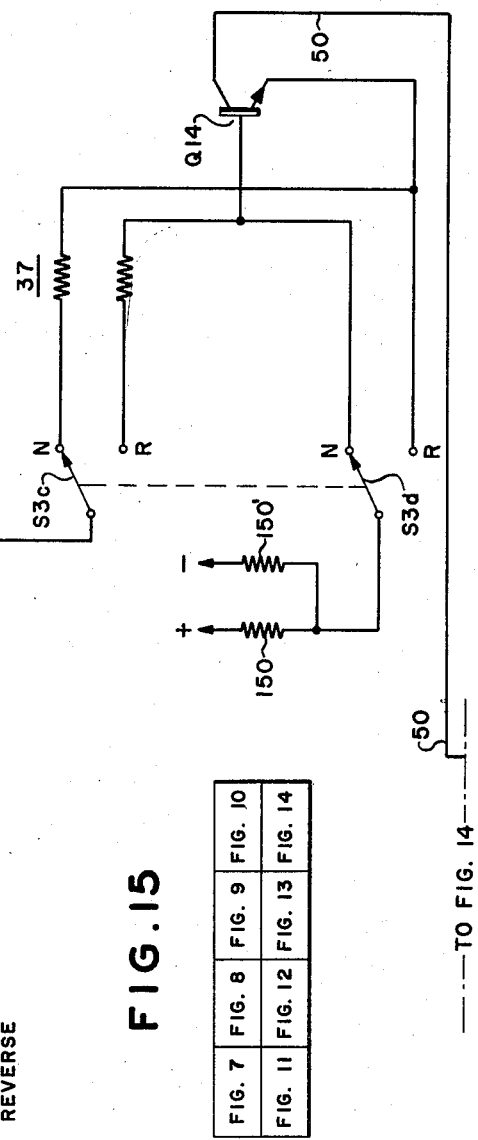

INVENTORS
J. E. BOUGHTWOOD
A. BOGGS
T. A. CHRISTIE
BY /s/ Presson
ATTORNEY

March 22, 1960    J. E. BOUGHTWOOD ET AL    2,929,875
TRANSMISSION TEST APPARATUS Filed Dec. 19, 1957    10 Sheets-Sheet 9

INVENTORS
J. E. BOUGHTWOOD
A. BOGGS
T. A. CHRISTIE
BY
ATTORNEY

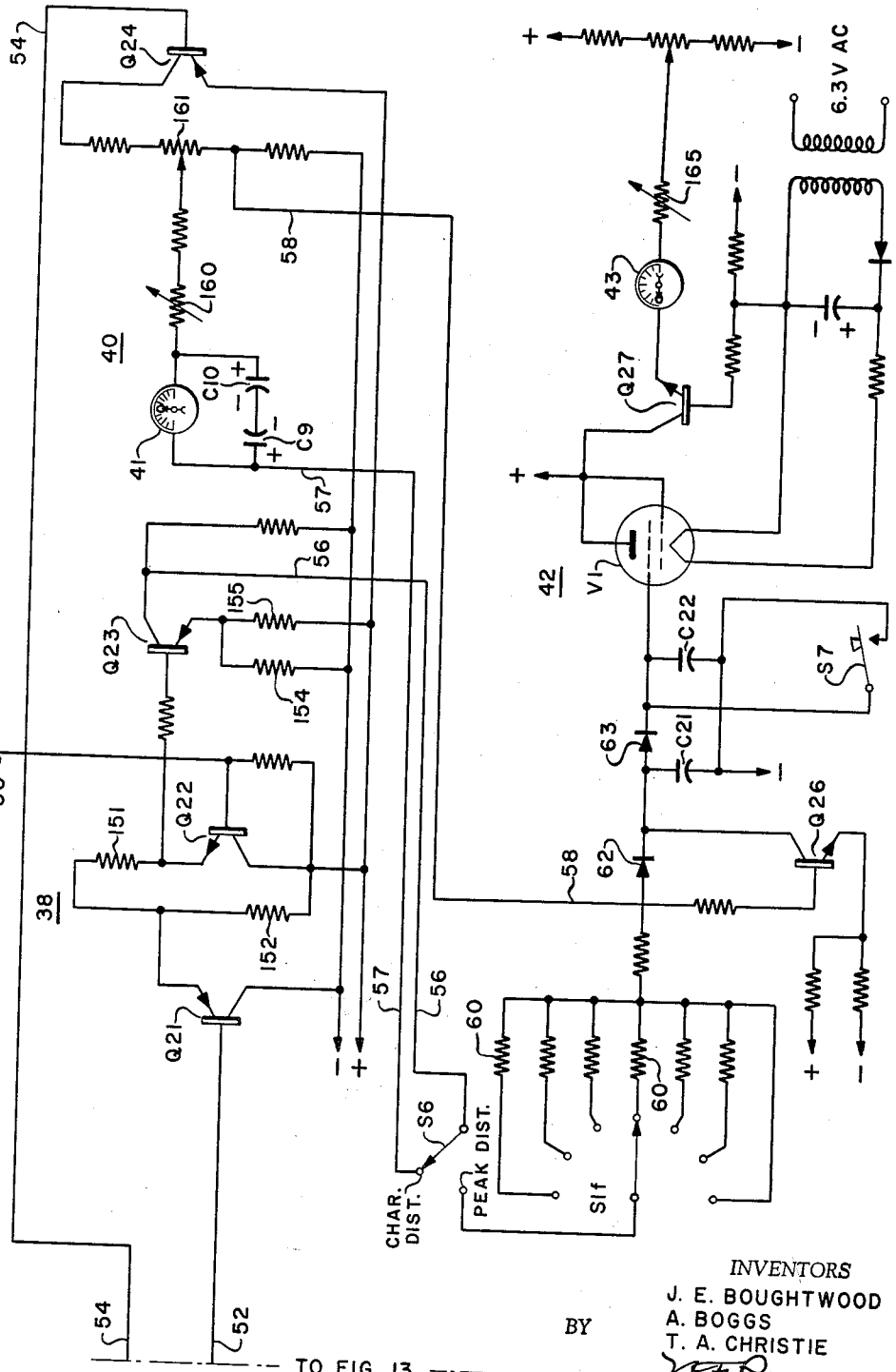

United States Patent Office 2,929,875
Patented Mar. 22, 1960

2,929,875

TRANSMISSION TEST APPARATUS

John E. Boughtwood, Halesite, and Albert Boggs, Jackson Heights, N.Y., and Thomas A. Christie, Jr., Menlo Park, Calif., assignors to The Western Union Telegraph Company, New York, N.Y., a corporation of New York Application December 19, 1957, Serial No. 703,921

18 Claims. (Cl. 178—69)

This invention relates to transmission test apparatus for measuring different kinds of distortion which may occur in marking and spacing telegraph signal pulses and which may be introduced either by line conditions or by improper adjustment or failure of the sending and receiving equipments employed, and more particularly to an improved high speed electronic telegraph distortion measuring set which provides direct meter reading of bias distortion, characteristic distortion and peak fortuitous distortion at relatively high transmission speeds.

Until recent years the transmission of data in binary form was confined almost exclusively to low speed communication systems, the transmission speed of the systems being limited by the rate of operation of printing telegraph or other terminal equipment, and distortion measuring devices for determining the efficiency of synchronous or start-stop telegraph transmission circuits or equipment were well known to the art. However, the recent introduction of integrated data processing systems and computer centers requires the transmission of voluminous information in binary form and at high speeds, and it is now necessary to provide a transmission measuring set capable of operation at the high speeds involved.

Distortion in binary pulse transmission may be defined as the deviation in length or relative time relationship of the received pulses from the length and time relationship of their transmission. A signal is defined as unbiased when the unit marking and spacing pulses are of the same length or time duration. Bias distortion usually results from improper adjustment of terminal or circuit equipment. Distortion which is caused by electrical or magnetic characteristics of the equipment or circuit under test is defined as characteristic distortion; it is the amount by which a given pulse is lengthened, shortened or displaced due to the presence or absence of neighboring pulses, and is caused by "memory" effects in the transmission path. More exactly, the maximum amount by which the space-to-mark and mark-to-space transitions of a selected pulse are shifted from their ideal locations by the presence or absence of neighboring pulses is the measure of characteristic distortion. A device to measure characteristic distortion might then consist of a pulse pattern generator for sending the various combinations of marking and spacing pulses, a circuit for selecting one of the received pulses for examination, and a circuit for comparing the distorted received pulse with the undistorted transmitted pulse to indicate the amount of distortion. The characteristic distortion would be taken as the largest value indicated for all possible combinations of pulses from the pattern generator.

Fortuitous distortion is that displacement of signal transitions resulting from extraneous electrical interferences in the transmission circuit. This interference is random in nature and has no fixed relation to the testing signals. The "instantaneous" distortion caused by fortuitous interference will vary widely although the "average" effect of the repeated pulses will integrate to zero. It is conventional to measure fortuitous distortion as the largest transition displacement encountered in a given period of time. The measurement of fortuitous distortion should not be influenced by the characteristic distortion of the circuit under test. A pattern to measure fortuitous distortion might then consist of a pattern generator for sending marking and spacing pulses of equal length, a circuit for selecting one of the pulses for examination, and a peak reading instrument for measuring the largest transition displacement during the period of observation.

In transmission testing machines commonly employed by telegraph companies, usually the ninth pulse of various 10-unit test signal combinations is designated for observation and a trace representing its duration is recorded on an electrosensitive tape or other recording medium. Selected signal combinations are then sent into the circuits and by a visual comparison of the respective ninth pulse traces of the various combinations with the trace of a distortion-free pulse, the "average" characteristic distortion of the circuit may be determined.

In a accordance with the instant invention the test set employs a test signal transmitter and a test set receiver operating in synchronism by virtue of a common oscillator timing wave source, or by the provision of a suitable synchronizing arrangement for the receiving station oscillator, distortion testing can proceed where the two ends of the circuit are not available at the same place. A multiposition switch changes the oscillator frequency in steps, for example, in ten 200-cycle steps, from 200 to 1400 c.p.s. On the transmitter side of the test set the oscillator circuit is applied, via squaring, differentiating and shaping circuits, to an electronic distributor, for example, a 10-anode beam switching tube. Pulses from the distributor, at an output rate of 200 to 1400 pulses per second are applied to a signal selector switch having ten positions whereby ten test signal combinations, each having a length of ten pulses, can be transmitted to the circuit under test which includes not only the telegraph line or channel conductors but also the various instrumentalities utilized in and forming part of the communication circuit.

On the receiver side of the test set the same oscillator output, or a synchronized oscillator output, is applied, via adjustable phase shift networks and a similar series of squaring, differentiating and shaping circuits, to an electronic distributor comprising a second 10-anode beam switching tube. The distributor on the receiving side necessarily is in synchronism, although not necessarily in phase, with the transmitter-distributor, and the output pulses have the same width, i.e., signal length, as those sent by the transmitter-distributor. A phase switch adapted to individually select any two of the ten anodes of the tube distributor; a coincidence, or gating, circuit; and a comparison circuit including a differential type meter calibrated to read characteristic distortion in percent, are embodied in the system; a meter for the measurement of peak distortion is also included.

The determination of percent distortion involves measuring the departure in time position of the leading and trailing edges, or transitions, of an arriving distorted pulse from the corresponding edges, or transitions, of a distortion-free pulse such as that established by a pulse from a train of successively alternating pulses each of uniform length transmitted and received over the same circuit. This is accomplished by first calibrating the system by transmitting the A.C. pulse train over the line and return to the coincidence or gate circuits, while adjusting the receiving-side phase switch and phase shift networks until a locally generated gate pulse derived from a first selected anode of the beam switching tube of the receiver side of the test set and applied to the coincidence circuit overlaps the leading half-portion of a single pulse of the A.C. train. This half-pulse output from the coincidence circuit is then applied to one side of the differential meter. By then adjusting the amplitude of a locally generated reference pulse (full length) from a second selected anode and applying it to the other side of the meter until the second pulse area equals the area of the one-half length A.C. pulse, a zero-center meter reading will be obtained since the second pulse and the leading half-portion of the distortion-free pulse are applied differentially to the meter. The instrument is now calibrated for reading distortion of the pulses in various other test pattern signal combinations.

Test signal combinations are then transmitted over the line circuit and a local gate pulse is selected, preferably the one which occurs during the leading portion of the ninth pulse of the test signal combination, and the meter will deflect in one direction or the other relative to zero center depending on whether the area of the leading half-portion is greater or smaller than the area of the foregoing calibrated reference pulse which is one-half the area of the calibrating A.C. pulse previously transmitted. By switching to the next phase switch setting, the trailing portion of the received pulse of the test pattern signal combination can then be examined.

Since the two distributors are synchronized, the received and local pulses will always have the same repetition rate regardless of the test frequency and hence the characteristic distortion meter needs no further calibration when the signal frequency of the test signal is changed. The method employed measures an averaged condition such as is presented by characteristic distortion of a repeated specified telegraph signal. Peak fortuitous distortion such as may be caused by fortuitous interference may be measured by connecting the output of the coincidence circuit to a peak reading meter circuit of long time-constant which will provide a readable indication of the maximum time displacement of the leading or trailing edges of the received pulse. The test signals should be A.C. in order to eliminate the effect of characteristic distortion.

An object of the invention is the provision of an improved electronic telegraph distortion measuring set which enables testing at high speed and at different test signaling speeds with direct meter reading of characteristic distortion and having an automatic adjustment to compensate for changes of the test signaling speeds.

Another object is to provide an electronic test set for measuring the distortion of a selected pulse from a received periodically repeated telegraph signal combination which is subject to distortion, by comparing it with a previously received undistorted signal pulse sent over the same circuit and having the same repetition rate and phase position as the pulse under measurement.

An additional object is the provision of test apparatus of the character described in which is generated a gate pulse having the same length and repetition rate as that of an undistorted signal pulse, and in which the phase of the gate pulse is adjustable to cause it to straddle the leading and/or trailing transitions of the received signal pulse under measurement in a manner to segregate the leading and trailing portions thereof for determination of distortion.

Still another object is the provision of a test set which selects either the leading or trailing portion of a received signal pulse to be measured and applies the selected portion thereof to a meter circuit to measure either characteristic or peak distortion in the received signal pulse.

Other objects and advantages of the invention will be apparent from the following description, taken in connection with the accompanying drawings in which:

Fig. 3 is a chart which illustrates the theory of the bias and characteristic distortion measurements;

Fig. 4 illustrates two signals respectively with marking and spacing bias, and shows the resultant pulses applied to the measuring circuit;

Figs. 5 and 6 show typical characteristic distortion curves;

Fig. 9 shows signal selector and beam switching tube elements in the transmitter section;

Fig. 10 depicts circuit connections for transmitting test signals to the transmission line under test and for receiving the signals after transmission over the line;

Fig. 14 shows a characteristic distortion indicating meter circuit and a fortuitous distortion indicating meter circuit in the receiver section; and Fig. 15 indicates how Figs. 7 to 14 should be arranged with respect to one another.

*General circuit description*

Figure 1:
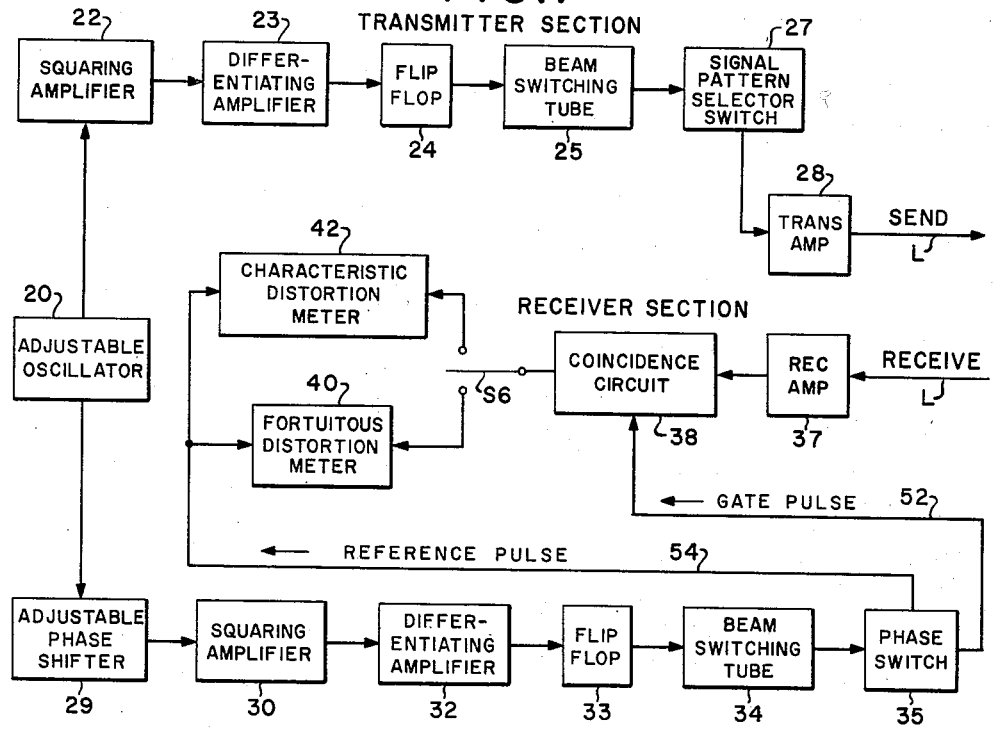
Fig. 1 is a block diagram of a test set embodying the principles of the instant invention.

Referring to Fig. 1 of the drawings, there is shown a single line block diagram of the testing set. The set may be completely transistorized except for two magnetron beam switching tubes and a subminiature electrometer tube. In Fig. 1 it is assumed that both the send and receive ends of the circuit under test are available at the same place. Both the transmitter and receiver sections of the test set are controlled by the output of a 200–1400 c.p.s. sine wave oscillator 20 adjustable in steps of 200 cycles. The oscillator frequency enters the transmitter section through a squaring amplifier 22, and the square wave output from this amplifier is then differentiated in the amplifier 23 and the resultant pulses used to trigger a standard bistable flip-flop stage 24. Since the flip-flop reverses once per cycle of the applied frequency, its output is a highly symmetrical or unbiased square wave, i.e., the time delay of the negative and positive loops are equal. Two appropriately phased outputs from the flip-flop 24 drive the odd and even grids respectively of a ten-position beam switching tube 25 to advance the beam one position for each reversal of the flip-flop. A ten-position signal pattern selector switch 27 associated with the beam switching tube permits any one of ten signal patterns to be selected for transmission at a bit rate equal to the oscillator frequency in cycles per second.

The adjustable oscillator 20 also operates a second beam switching tube 34 in the receiver section of the test set so that both tubes run at exactly the same speed. The drive circuit for the receiver tube includes a continuously adjustable phase shift network 29 of 360° range. The output of the phase shifter 29 is applied to a squaring amplifier 30 and thence to a differentiating amplifier 32, the output of which drives a flip-flop 33 which, in turn, controls the beam switching tube 34. The phase shifter network 29 in conjunction with a phase switch 35 associated with the beam switching tube permits a gate pulse and a reference pulse to be obtained once per revolution and which can be placed in any desired time relationship with the transmitter signal pattern. These pulses have precisely the same length as the transmitter pulses. The gate pulse is used to select any desired signal pulse from the received signal pattern, to which the reference is then compared for characteristic or fortuitous distortion measurement.

Figure 2:
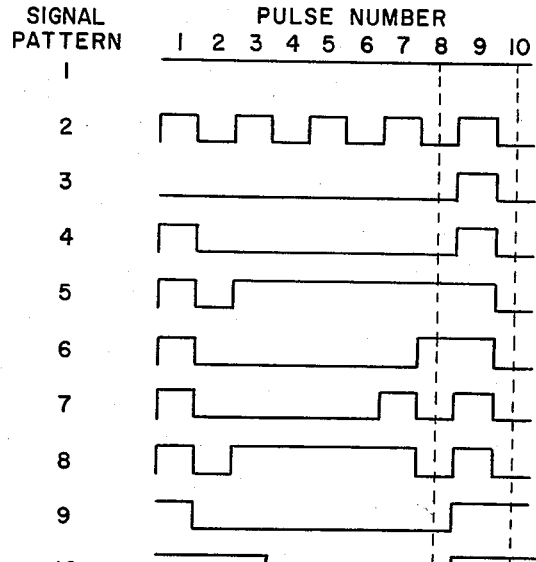
Fig. 2 is a chart showing various signal patterns available from the transmitter side of the test set.

Ten signal patterns each consisting of ten bits are available for transmission as indicated in Fig. 2; the polarity of transmission can be as shown or reversed as desired. After transmission through the circuit or equipment under test, pulse No. 9 usually is selected for characteristic distortion analysis; the signal patterns have been selected to include combinations producing the maximum distortion of the No. 9 pulse that could occur with normal random message traffic.

*Bias and characteristic distortion measurement.*—A circuit for the selection of the received signal pulse for bias or characteristic distortion measurement is shown in detail in the upper portion of Fig. 14. After transmission over the system under test, the signals enter the coincidence circuit 38 over conductor 50. A gate pulse from the receiver beam switching tube is selected by means of the phasing switch and enters over conductor 52. Transistors Q21 and Q22 comprise the coincidence circuit with its output at transistor Q23, and transistor Q24 and a 50-0-50 scale meter 41 comprise a differential meter circuit 40, it being understood that the switch S6 is thrown to its upper position as seen in Fig. 14. The output of the coincidence circuit, over conductors 56 and 57, enters the metering circuit, and a reference pulse over conductor 54 from the receiver beam switching tube enters through transistor Q24. The manner in which the amount of bias or characteristic distortion is indicated by the meter 41 is illustrated in Fig. 3. Bias measurements are made on A.C. signals, signal pattern 2 of Fig. 2 which is obtained in position 2 of the signal pattern selector switch 27, Fig. 9. Any pulse of the pattern may be selected for bias distortion measurements, but the No. 9 pulse preferably is used for characteristic distortion measurements.

The received A.C. test signal pattern is shown at A in Fig. 3. If these signals are unbiased they will be exactly the same length as the gate pulse B from the receiver beam switching tube. The gate pulse can be made to straddle either the leading or trailing edge selectively of a received signal pulse, and thus select either the leading or trailing edge, or transition, of the received signal pulse, by means of the phase switch and the adjustable phase shifter included in the receiver beam switching tube drive circuit.

The output of the coincidence circuit is shown at C in Fig. 3 and the reference pulse at D. The length of the D pulse is exactly the same as the B (gate) pulse but its amplitude is made to be precisely one-half the amplitude of the C (coincidence) pulse. By properly adjusting the phase of the gate pulse B, the C pulse for the leading transition of the No. 9 pulse can be made exactly the same length as the C pulse for the trailing transition of the No. 9 pulse so that both C pulses have the same length and area. If the signals are unbiased then both C pulses are also equal in area to reference pulse D. Since the D pulse and a C pulse are applied alternately and differentially to the zero center (direct current) meter 41 seen in Fig. 14, a zero reading of the meter will result. If the received signals at A are biased, the length of the C pulses for the leading and trailing edges will still be equal. However, the C pulses will be greater or lesser in area than the D pulse, depending on whether the bias is marking or spacing, and the differential meter 41 will indicate directly the direction and magnitude of the bias in percent of the duration of an undistorted pulse. Integrating condensers C9 and C10 in the differential meter circuit 40 produce a steady meter reading by eliminating the effects of fortuitous interference.

A bias measurement is made by alternately switching between two adjacent positions of the phase switch 35, to alternately select the leading and trailing transitions, and simultaneously adjusting the phase shift network 29 for the same meter reading. If the meter reading is zero this indicates that no bias is present.

Before characteristic distortion measurements can be made, all bias must be removed from the signals to be measured using the foregoing procedure to indicate the unbiased condition. As previously described, characteristic distortion is measured by selecting a signal pulse, such as No. 9, and observing the displacement of the leading and trailing transitions for the various test signal patterns. The displacements are measured relative to the location of the leading and trailing transitions for signal pattern 2 of Fig. 2.

Pulse No. 9 is selected for measurement by transmitting signal pattern 3, Fig. 2 consisting of a single pulse in position No. 9. If gate pulse B, Fig. 3, is coincident with any other pulse position than No. 9, the differential meter will read —50% distortion since only reference pulse D is applied to the meter circuit. The leading edge of pulse No. 9 is located by rotating the phase switch 35, Fig. 13, in a clockwise direction until the meter reads other than —50%. The meter reading is a direct measurement of the leading edge displacement in percent of the length of an undistorted pulse. This reading can be converted to time if desired since the pulse transmission rate is accurately known. If the leading edge is not affected by characteristic distortion it will have the same location as for pattern 2, Fig. 2, and the meter will read zero.

The displacement of the trailing edge can similarly be measured by rotating the phase switch to the next adjacent clockwise position. In such fashion the displacement of the transitions will be measured for signal patterns 3 through 10. The amount of characteristic distortion for the particular transmission speed is taken as the largest meter reading of the series. To completely delineate the characteristic distortion, measurements must be made for a range of speeds. Typical curves of distortion versus speed measured in a medium speed data channel are shown in Figs. 5 and 6. The effect of speed on the leading transition of the No. 9 pulse for pattern 3 is shown in Fig. 5, and the trailing transition of the No. 9 pulse for pattern 6 is shown in Fig. 6.

*Fortuitous distortion measurement.*—Distortion displaces the leading and trailing transitions of a signal pulse in a random manner. It is customary to measure the greatest displacement occuring in a specified time interval and to define this value as the peak fortuitous distortion of a circuit or equipment under test. Fortuitous distortion measurements are made on the A.C. signals, signal pattern 2, to eliminate any meter deflection due to characteristic distortion. The signals must also be checked for bias and corrected if necessary, as previously described. The circuit used to measure peak fortuitous distortion is illustrated by the measuring circuit 42 in Fig. 14. Reference pulses from the receiver beam switching tube are applied from a transistor Q24 and over conductor 58 to a transistor Q26. The fixed amplitude pulse from the output Q23 of the coincidence circuit 38 is applied to an integrating capacitor C21 through a selected resistor 60 and a diode 62. The capacitor C21 charges to a voltage directly proportional to the time duration of the pulse and is bound by the action of the diode. A capacitor C22, which is small compared to C21, charges through a diode 63 to the same value as C21. The reference pulse from the receiver beam switching tube discharges C21 by driving the transistor Q26 to conduction, leaving a bound charge on C22.

If the next selected pulse is longer than the preceding pulse due to fortuitous distortion, the capacitors C21 and C22 will charge to a higher value. In this manner a charge is accumulated on C22 which is proportional to the largest displacement of the pulse transition. The voltage on capacitor C22, due to its accumulated charge, is measured by the electrometer tube V1. The cathode current of tube V1 is thus a measure of the widest pulse occurring during the measuring period. This current is amplified by a transistor Q27 and displaced on a 0-40 scale meter 43 calibrated to indicate distortion in percent of the length of an undistorted pulse. Both the leading and trailing transitions are separately measured, the larger of the two being the peak fortuitous distortion for the particular speed of transmission. Calibration is maintained for different speeds of transmission by the automatic selection of the proper charging resistor 60 for a given signaling speed.

*Specific description of circuit components*

Figure 7:
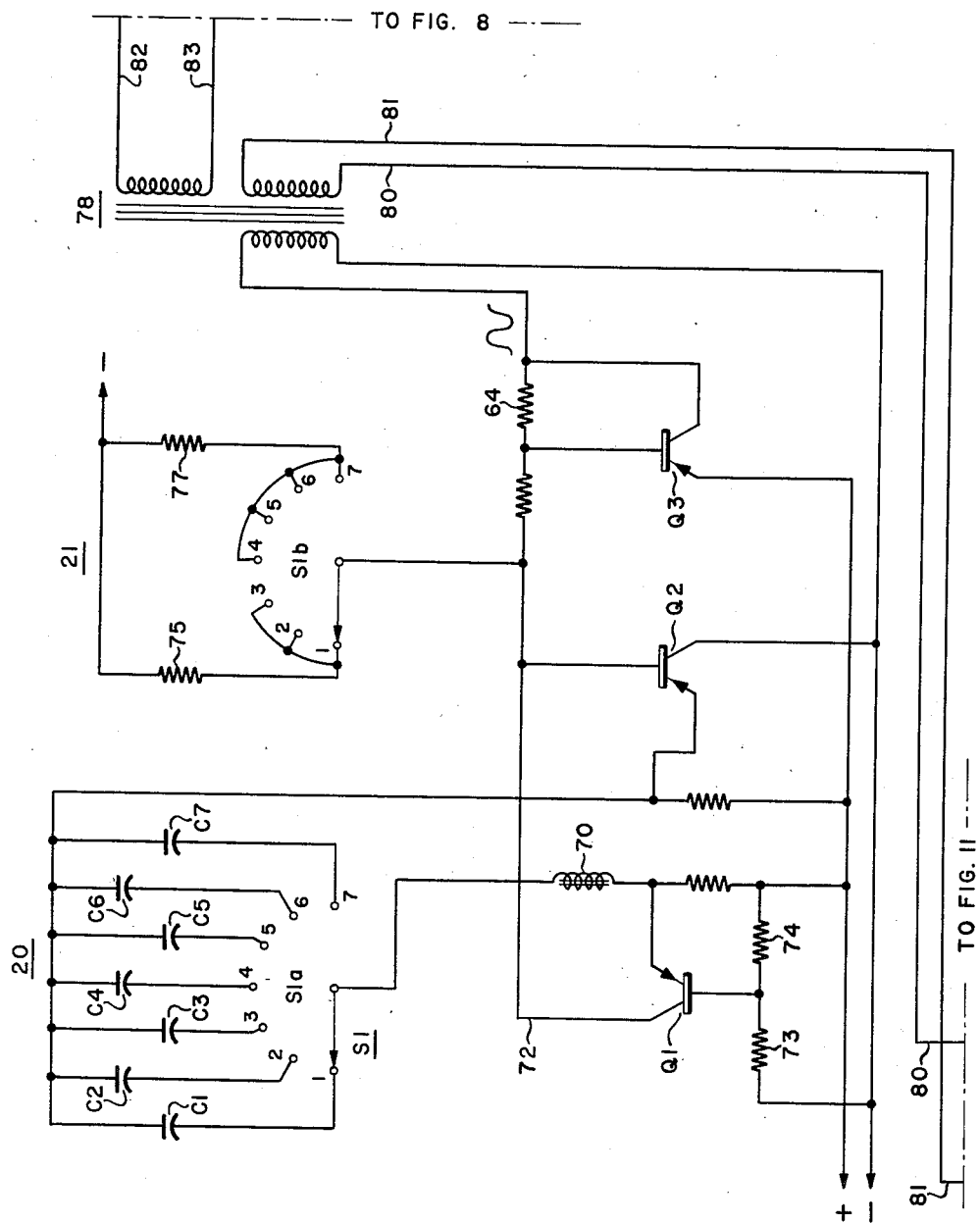
Fig. 7 is a detailed circuit diagram showing the adjustable oscillator and frequency selector elements in the transmitter section of the test set.

Referring to Fig. 7 of the drawings there is shown the oscillator 20 which uses series tuned LC elements as frequency determining circuits, which arrangement is compatible with transistors since they are essentially low impedance, current amplifier devices. The LC elements comprise an inductor 70 and capacitors C1 to C7 selectively connected in circuit by the arm and contacts 1 to 7 of a switch bank S1a. This switch bank or level is one of six which are embodied in a gang switch S1, the different levels or banks being designated as S1a to S1f. Two of the banks S1a and S1b are shown on Fig. 7; three of the banks S1c, S1d and S1e are seen on Fig. 11; and the remaining bank S1f is seen on Fig. 14. Since various of the switch banks of S1 are shown on different sheets of the drawings, it was not possible to indicate the ganged relationship in the usual manner, but it will be understood that all of the arms of the switch banks are operated simultaneously. Referring again to bank S1a of Fig. 7, the capacitors C1 to C7 and the indicator 70 have values such that the seven-position switch can change the circuit to adjust for frequencies in 200 cycle steps from 200 to 1400 c.p.s.

The signal developed in the emitter of a PNP transistor Q2 connected in a common collector configuration is applied to the emitter of a common base circuit of a PNP transistor Q1 via the series LC frequency determining elements and the output developed in the collector of the transistor Q1 is applied directly by a conductor 72 to the base of the transistor Q2, thereby amplifying the current which is in phase with the original signal on the emitter of Q2 to sustain the oscillations. Resistors 73 and 74 connected to the base of Q1 are so proportioned as to establish the proper bias, the resistor 73 having a considerably higher value than resistor 74. The second switch bank S1b has seven steps for controlling the amount of feedback to keep the signal applied to a buffer amplifier comprising a transistor Q3 within desired limits. Resistors 75 and 77 are connected in circuit with various of the switch terminals of S1b, resistor 75 having a somewhat lower value than resistor 77.

A buffer amplifier comprising the transistor Q3 has a common emitter configuration with a negative feedback resistor 64 for stabilization and harmonic suppression. A transformer 78 in the output circuit of the buffer amplifier provides two outputs from its secondary windings, the lower one of the windings being connected by conductors 80 and 81 to the sine wave phase shifter 29 shown on Fig. 11 and hereinafter described in detail. The upper secondary winding of the transformer 78 applies an output over conductors 82 and 83 to the square wave amplifier circuit 22 seen in Fig. 8, the amplifier circuit including two PNP transistors Q4 and Q5, an NPN transistor Q6. The output of the square wave amplifier is applied to the RC differentiator circuit 23 which works from a square wave form, and includes a capacitor C8, a resistor 97 and an NPN transistor Q7. Positive and negative pulses are applied to the common emitter transistor Q7; the output of the transistor consists of negative pulses only, positive pulses being discarded. The collector is driven to saturation and the output negative pulse is taken off a voltage divider 84. By driving to saturation, the amplitude of the output pulses remain the same for any variations in amplitude of the input pulses.

From the output of the differentiator the signals are applied to a standard bistable flip-flop circuit 24 including two PNP transistors Q8 and Q9. A negative pulse applied to the collector of the On transistor turns it off. The RC coupling between the collector of the On transistor and the base of the Off transistor causes the Off transistor to change its state when the On transistor turns off. The output taken from the collectors is a square wave of one-half the frequency of the basic sine wave oscillator.

The output conductors 90 and 91 from the flip-flop circuit extend to a clamping circuit 31. From the clamping circuit conductors 93 and 94 respectively extend to the even and odd grids 0 to 9 of the transmitting magnetron beam switching tube 25, Fig. 9. This tube contains a common cathode and ten targets or plates. A beam is formed between the cathode and a target, and the beam is advanced to the next target each time the flip-flop circuit 24 operates. Thus a current is made to flow consecutively into each target circuit. A common load resistor 106, seen in Fig. 10, is switched in and out of each target circuit as determined by the test pattern selector switch 27. This switch has nine switching banks S2a to S2i and is settable to any one of ten positions to give the various desired test code combinations shown in Fig. 2.

A self-starting circuit is needed to form the beam in the switching tube 25 when the test set is turned on. An NPN transistor Q10 has its collector connected to plus battery via a resistor 107 in the 0 spade circuit of the beam tube. The emitter of Q10 is connected to negative battery via the common cathode resistor 108 of tube 25. The transistor base is biased so that when no beam is formed in the switching tube (transistor emitter at negative battery voltage) current flows in the transistor collector thus lowering the beam tube spade voltage and causing the beam to form on the 0 target. When the beam is formed, current flows through the cathode resistor 108 raising the emitter voltage enough to cut off the transistor thus effectively eliminating it from the circuit for so long as a beam is formed.

From the selector switch 27 conductors 104 and 105 extend to a "reverse-normal" switch comprising arms S3a and S3b, Fig. 10, which allows the mark-space relationship in the test patterns to be reversed if desired. The signals are passed to a transistor clipper-amplifier circuit 28 which includes a PNP transistor Q12 and an NPN transistor Q13, and thence by means of switch arm S8a to an output terminal T1 where they are available to a transmitter for sending the test signals which consist of pulses of negative polarity over conductor L1 of the transmission circuit under test. In the "Normal" position of the switch S3, the "marking" signals sent to the circuit under test are represented by pulses of negative polarity and the "spacing" signals are represented by the absence of current. These conditions are reversed when the switch S3 is in the "Reverse" position. Switch arms S8a and S8b when thrown downwardly to their contacts S enable the test pattern signals to be applied directly to the receiver side of the test set for alignment and calibration purposes.

Figure 11:
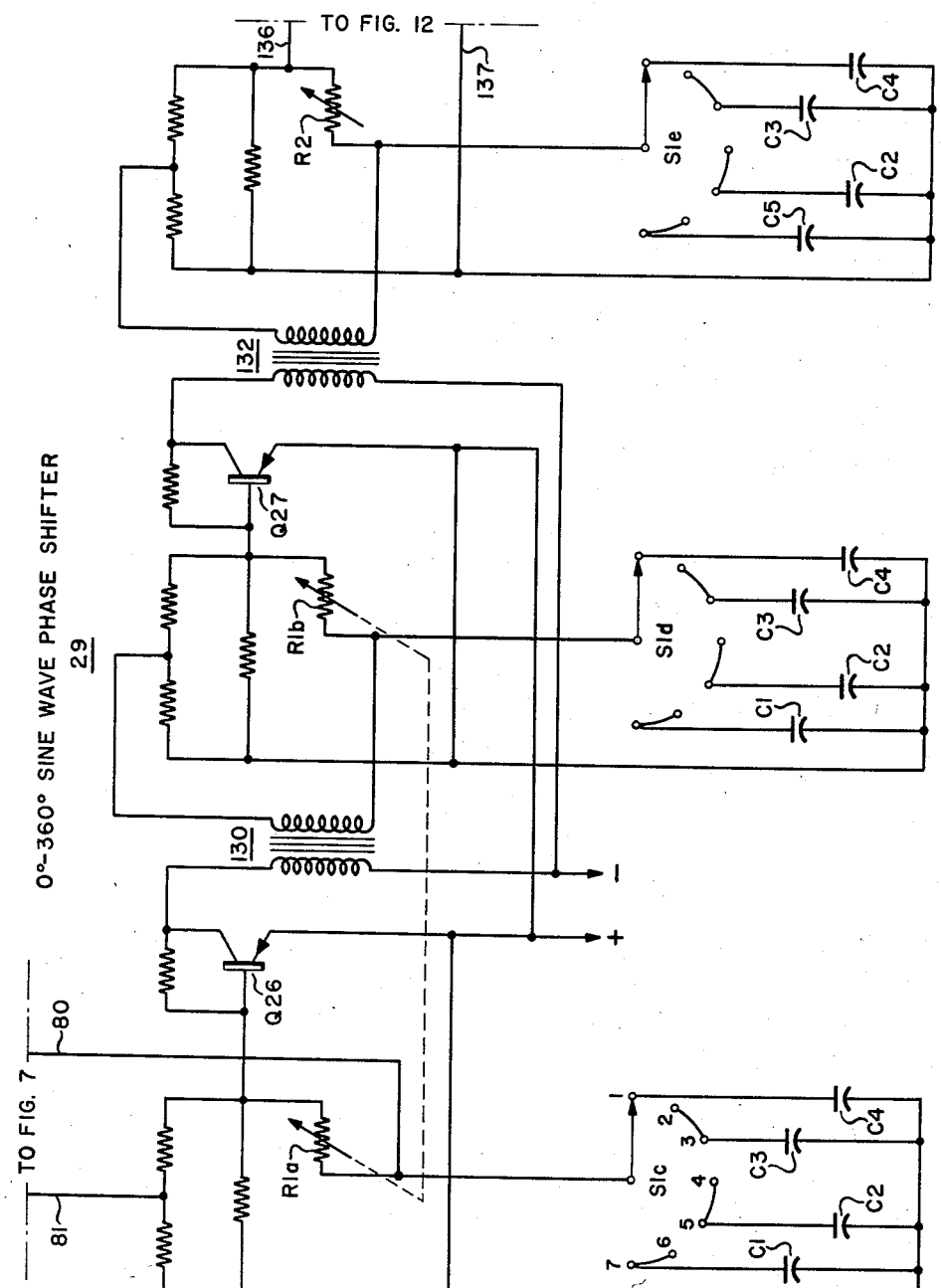
Fig. 11 shows an adjustable phase shifter employed.
Figure 12:
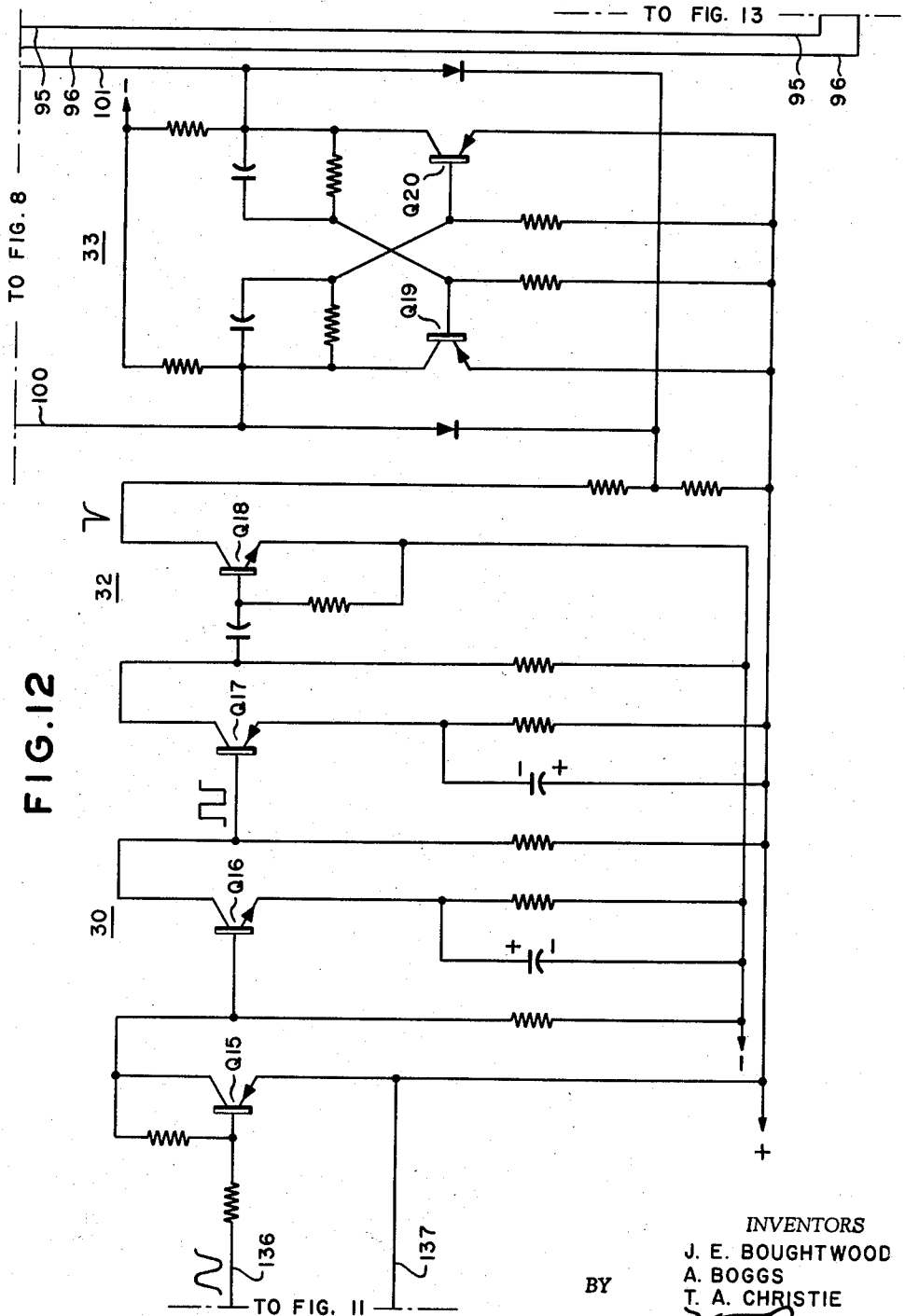
Fig. 12 shows a square wave amplifier, differentiator and flip-flop in the receiver section.

The receiver side of the test set is principally shown on the lower portion of Fig. 10 and on Figs. 11 to 14. Referring to Fig. 11 there is shown the sine wave phase shifter 29 to which is applied, over conductors 80 and 81, the output from the transformer 78 of the buffer amplifier Q3 of Fig. 7. The phase shifter comprises three identical phase shift networks each of which is adapted to shift the current approximately 130° by varying a resistance. The first two phase shifting resistors are shown at R1a and R1b in the phase shifter circuit and their arms are ganged on one shaft as indicated. The third resistor R2 is separate and is independently adjustable for fine phase adjustment. The arms of switch banks S1c, and S1d and S1e are for the purpose of changing the capacitor value, by controlling the operative connection of condensers C1 to C4. It will be remembered that these switch arms are ganged with other arms of the switch S1, and the capacitor value is changed in each network when the basic frequency of the oscillator 20 of Fig. 7 is changed, in order to maintain a constant amount of phase shift range.

Loss of amplitude in each phase shift network is compensated for by the gain in an amplifier comprising a PNP transistor Q26 and a coupling transformer 130 between the first and second networks, and by an amplifier comprising a PNP transistor Q27 and a coupling transformer 132 between the second and third networks. The output of the phase shifter is applied, over conductors 136 and 137, to the squaring amplifier 30, Fig. 12, which includes PNP transistors Q15, Q17, and an NPN transistor Q16, and from thence through the differentiating amplifier 32 which includes an NPN transistor Q18, and followed by the flip-flop circuit 33 which includes PNP transistors Q19 and Q20.

Figure 8:
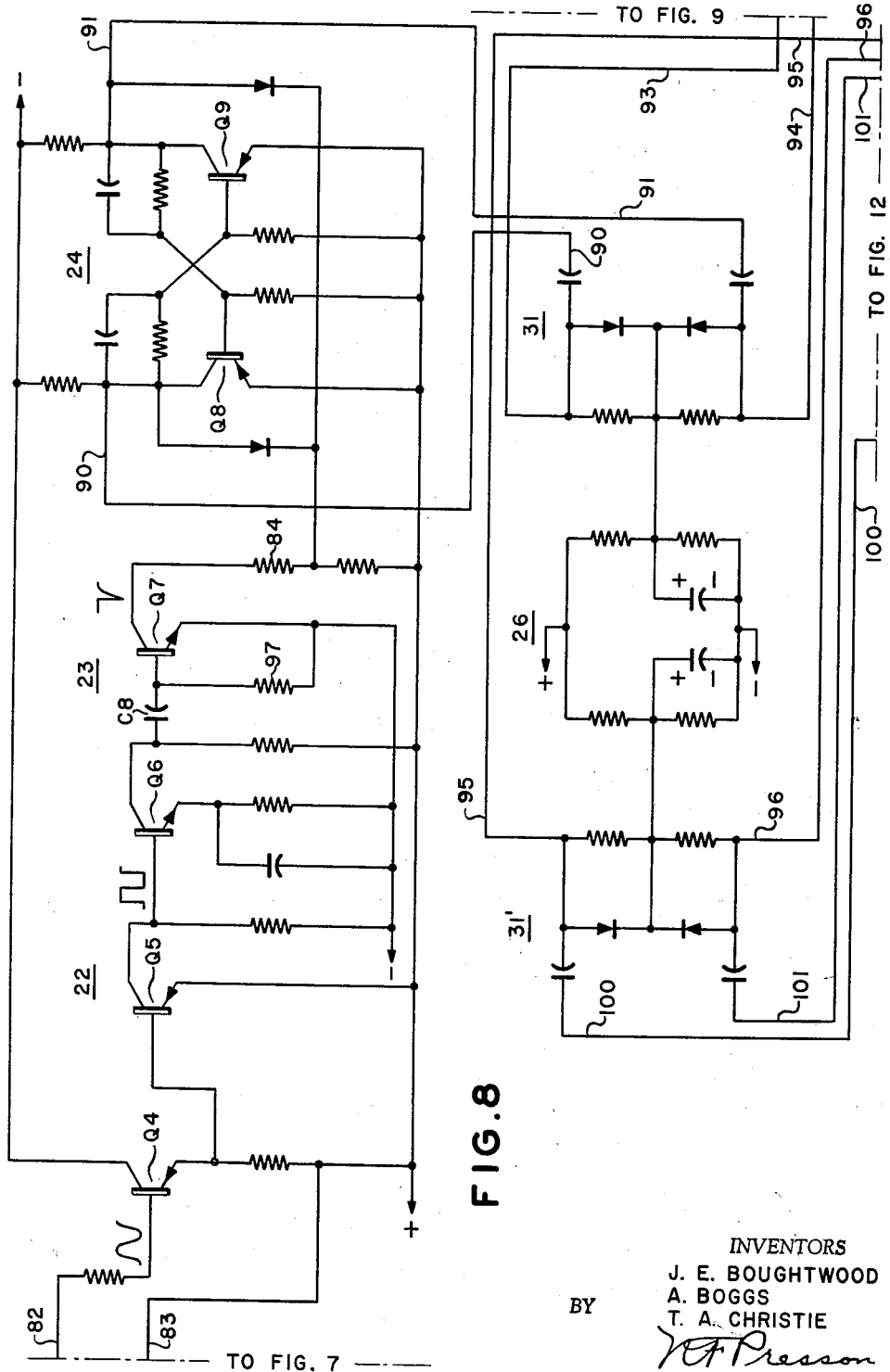
Fig. 8 shows the square wave amplifier, differentiator and flip-flop elements in the transmitter section.
Figure 13:
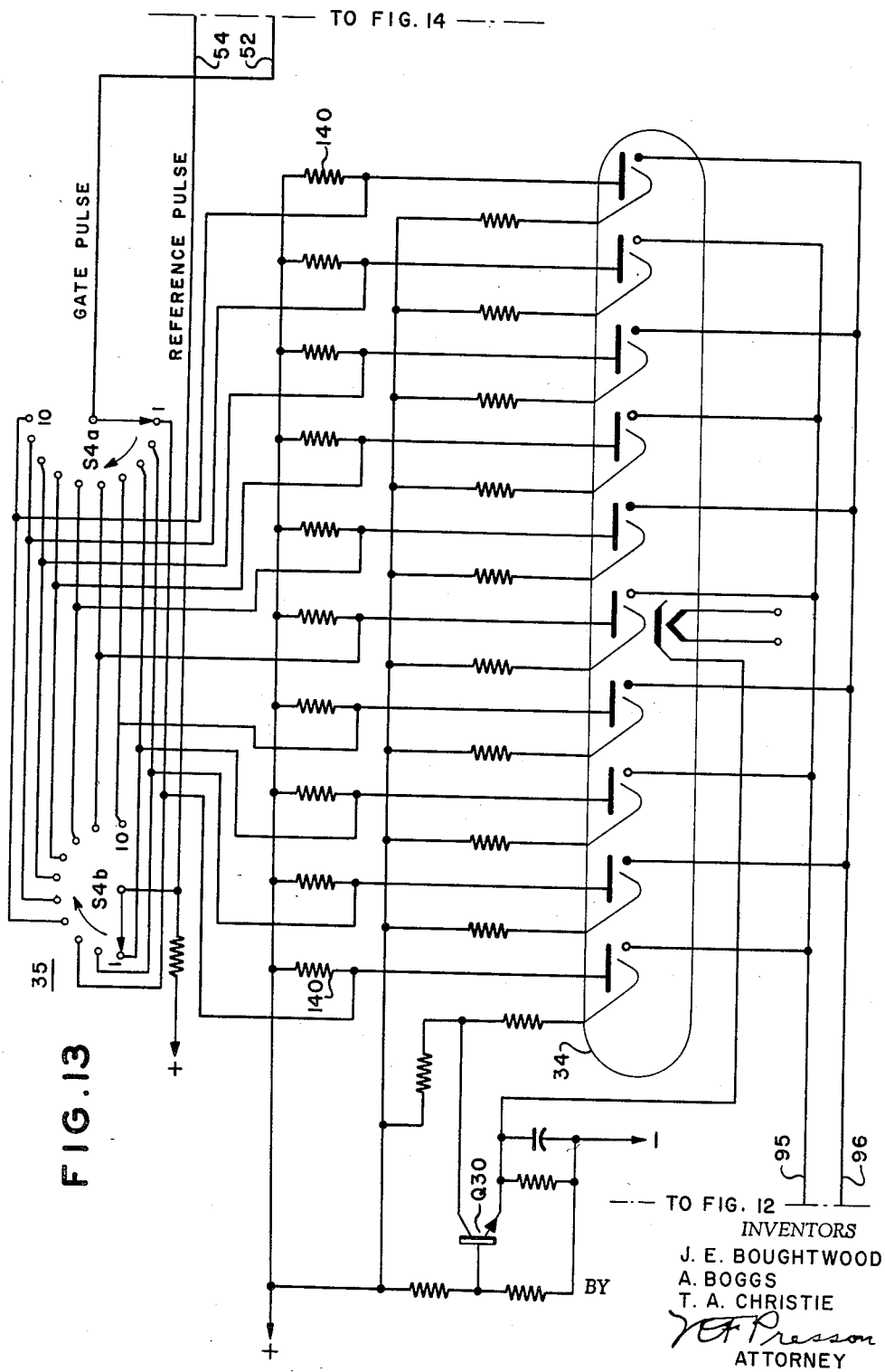
Fig. 13 shows a phase switch and beam switching tube in the receiver section.

The output conductors 100 and 101 from the flip-flop extend to a clamping circuit 31' of Fig. 8, and from the clamping circuit conductors 95 and 96 respectively extend to the even and odd grids of the magnetron beam switching tube 34, Fig. 13, and which may be like the transmitting magnetron beam switching tube 25 of Fig. 9. The tube 34 is operated by the flip-flop circuit 33 associated with the phase shifting networks 29. Each target of the tube has a resistor 140 permanently connected to it so that by means of the ten position phase switch, generally indicated at 35 and having ganged switches S4a and S4b, any one of the ten rectangular target pulses can be used as a gating signal. This feature, plus the phase shifting circuit 29, allows the gate pulse (over conductor 52) to be placed in any desired time relation with respect to received signals. The tube 34 has a self-starting circuit including an NPN transistor Q30 similar to the starting circuit of the transmitter tube.

It is necessary to examine a certain portion of the received signal in order to measure either characteristic or peak distortion present, and this is done by allowing only a part of the received signal through the gating circuit and onto the distortion measuring circuits. After transmission over the system under test the signals are received over conductor L2, Fig. 10, of the transmission circuit and thence to terminal T2 and switch arm S8b; the circuit continues over conductor 110 and through a switch arm S3c when in position N (normal) as shown, and then is passed through an amplifier circuit 37, which includes an NPN transistor Q14, whose characteristics are changed depending upon the polarity of the pulses to be measured, as determined by the position of switch arms S3a to S3d. Due to the bias provided by the equal resistors 150 and 150', when current flows in conductor 110, with the switch S3 in the "Normal" position the transistor Q14 becomes conducting, and in the absence of current (spacing signals) the transistor becomes nonconducting. In the "Reverse" position of switch S3 the transistor Q14 will still conduct for a marking signal which is now represented by the absence of current and becomes nonconducting for a spacing signal which is now represented by negative current.

From the transistor Q14 the signals are applied over conductor 50 to the common collector NPN transistor Q22 of Fig. 14, the emitter of this transistor being returned via a resistive load 151 and 152 to plus battery thus making it impossible for current to flow in this emitter circuit. The PNP transistor Q21 with its collector tied directly to negative battery has its emitter tied to plus battery through a part 152 of the resistive load in the collector of Q22. The base of transistor Q21 is connected by the conductor 52 through the switch arm S4a of Fig. 13 and thence to the beam switching tube target which is to furnish a gate pulse, the gate pulse being selected by means of the phasing switch 35. When the beam is not formed on this particular target (9/10 of time) the transistor base voltage of Q21 of Fig. 14 is that of the plus battery which effectively makes the transistor an open circuit.

When the beam forms onto the selected gate target, the base voltage of Q21 is immediately lowered enough to make the transistor conduct. This closes the emitter circuit of the transistor Q22 to negative battery and the signal applied to its base immediately appears in amplified (current) form at its emitter so long as transistor Q21 conducts. This signal is then amplified in a common emitter circuit of Q23 the emitter of which is biased slightly negative by resistors 154 and 155; Q23 is driven to saturation whenever both Q14, Fig. 10, and Q21, Fig. 14, conduct so that the signal pulse applied to the distortion measuring circuit is always of the same amplitude despite any small variations in the input amplitude. The transistor Q23 also clips any remanant of the gate pulse that is present at the output. This circuit is unique as a gate in that it takes advantage of the complementary types of transistors and the constant current characteristics of the beam switching tube target. As hereinbefore stated, transistors Q21 and Q22 comprise the coincidence circuit with its output at transistor Q23, which output is applied over a circuit comprising conductor 56 and switch S6 either to the characteristic distortion measuring circuit 40 or to the peak fortuitous distortion meter circuit 42, depending upon the position of the switch. A negative gate pulse is applied over conductor 52 to transistor Q21 from the beam switching tube, and when simultaneously a negative signal pulse from the received signal train is applied over conductor 50, the transistor Q23 will conduct but only during the period of coincidence of the two pulses.

*Characteristic distortion measurement.*—As hereinbefore stated a received pulse is considered distortionless if it is the same shape (width) as the transmitted pulse and occupies the same relative position with respect to the other pulses in the transmitted sequence. If by means of a correctly positioned gate pulse, the first one-half of a distortionless received pulse (fixed amplitude and correct width) is applied to one terminal of the differential meter 41, and a reference pulse of a fixed amplitude and width and one-half the area of a distortionless pulse is applied to the other terminal, a zero deflection of the meter will result, indicating zero distortion. Distortion in the received pulse changes the location or time of occurrence of its leading edge, or transition, but since the gate pulse remains fixed in time and width the distortion will be translated to the meter as a change in width of the coincidence pulse applied. The pulse amplitude remains constant due to the saturation amplifier Q23 in the coincidence circuit. The reference pulse which is applied over conductor 54 to the other terminal of the meter circuit 40 remains constant so that any change in the width of the coincidence pulse causes a deflection of the differential meter 41. The meter can deflect in either direction depending on whether the leading transition occurs earlier or later than the transition of a received distortionless pulse, and the meter is heavily damped so that an average deflection over a period of time is read on the meter scale. This is a linear measure of the characteristic distortion indicated in percent.

Both beam switching tubes 25 and 34 are driven by flip-flop circuits operating at the same frequency, so that the transmitted pulses and gate pulses are exactly the same in width. By switching to the next consecutive clockwise position of the switch 35, Fig. 13, a measurement is made of the distortion of the second half or trailing transition of the received pulse. The characteristic distortion is taken as the largest meter reading obtained during the observation of the leading and trailing edges of the received pulse for all test signal combinations at a selected transmission rate as determined by the position of the oscillator control switch S1. An adjustable resistance 160 and a potentiometer 161 are provided for the calibration of the meter 41.

*Peak distortion measurement.*—As stated above the characteristic distortion measuring circuit reads the average width of the pulse (for any given test signal combination) coming out of the coincidence circuit. To determine peak or fortuitous distortion, in contrast to characteristic distortion, it is necessary to pick out and measure the widest pulse to come out of the coincidence circuit over a period of time. This has to be displayed on the meter 43, shown in the lower portion of Fig. 14, at least long enough to be conveniently observed. When a rectangular pulse of fixed amplitude is applied to the integrating capacitor C21 through the proper selected resistance 60 and the diode 62, a voltage will build up on the capacitor whose amplitude will be proportional to the length of time the pulse is applied; in other words, the wider the pulse the larger the peak voltage on the capacitor. Since it is necessary to examine each pulse individually, the reference pulses received over conductor 58 drive the transistor Q26 to conduction in order to completely discharge the capacitor C21 before the following coincidence pulse is received. In the peak measuring circuit shown means are provided to measure the largest voltage to appear across this capacitor and display it on the meter for a reasonable length of time.

The silicone diode 63 with a very large reverse resistance in series with a small capacitor C22 is connected in parallel with the integrating capacitor C21. The diode is poled so that the smaller capacitor will charge up with the integrating capacitor through the low forward resistance of the diode 63 but will not follow the integrating capacitor discharge because of the large reverse resistance of the diode. The diode 62 causes the charge to remain on C21 long enough to charge C22 to a like value. This means that the small capacitor C22 will charge up to the highest voltage to appear on the integrating capacitor C21 and remain there for a substantial period of time. The voltage on capacitor C22 is applied to the grid of the subminiature vacuum tube V1 having a very high grid impedance and connected as a cathode follower. The cathode voltage of this tube, as a result of the integrating process, is a measure of the widest pulse. The common collector transistor Q27 in the cathode circuit of tube V1 amplifies the current for display on the meter 43. The resistors 60, respectively of different values, in the integrating circuit are automatically changed by the switch arm S1f for each frequency at which the test set operates. An adjustable resistor 165 is provided for calibration of the meter 43.

Operation

The first step is to determine whether there is any bias present in the equipment of the circuit under test. With the signal selector switch 27 of Fig. 9 set on its position 2, a symmetrical A.C. signal test pattern (pattern No. 2 in Fig. 2) will be transmitted to the circuit and equipment. The gate pulse is set by alternately switching between two adjacent positions of the phase switch 27 of Fig. 9 to select the leading and trailing halves of a received signal pulse. The phase shift controls R1a, R1b and R2 of the phase shifter 27 of Fig. 11 are adjusted until the meter 41 of Fig. 14 gives the same indication in both positions of the switch 27, and this properly locates the position of the gate pulse B, Fig. 3, with respect to each received signal pulse. Preferably, and as shown in Fig. 13, the ganged switches S4a and S4b have their banks of contacts interconnected in such manner that the negative going reference pulse is always produced after the negative going gate pulse. This reference pulse as applied to the transistor Q24 of Fig. 14 is made to equal exactly one-half the amplitude of an undistorted bias-free pulse by means of the calibrating potentiometer 161 so that the area of the reference pulse is equal to one-half the area of an undistorted pulse. If there is no bias in the received signals the meter 41 will read zero. If the meter does not read zero, it indicates the amount of bias and whether it is marking or spacing in character. If bias is present in the equipment under test it should be adjusted to zero bias before making either characteristic or fortuitous distortion measurements.

*Characteristic distortion.*—Signal selector switch 27 is manually set to its position 3 to give signal pattern No. 3 shown in Fig. 2. The phase switch 35 of Fig. 13 is then operated, in a clockwise direction, through its successive positions until a reading other than —50% is observed on the characteristic distortion meter 41, which indicates that the gate is over the leading half of the No. 9 pulse seen in pattern No. 3. The meter will now indicate directly the characteristic distortion in percent of an undistorted pulse for the particular speed of transmission of the signal pattern. The signal selector switch 27 is rotated from its position 3 successively through its remaining positions 4 to 10, and the meter reading noted for each such position.

To measure the distortion on the trailing half of the received pulse No. 9, the phase switch 35 is moved one step in a clockwise direction from its previous setting, and the signal selector switch 27 is again operated successively through its positions 3 to 10, and the meter reading noted for each such position. The switch S3a of Fig. 10 is now thrown to its "Reverse" position to reverse the polarity of the transmitted test signals, and the foregoing test procedure is repeated. The characteristic distortion for the particular speed of transmission, as determined by the switch S1 of Fig. 7, is taken as the maximum reading for the foregoing series of meter readings. As hereinbefore stated, to completely delineate the characteristic distortion of the circuit, the test signals are transmitted over a range of appropriate signal speeds by moving the switch S1 successively to different positions, the foregoing observations being made at each such signaling speed.

*Peak fortuitous distortion.*—The signal pattern selector switch 27 is set on its position No. 2 which gives the A.C. signal pattern. Switch S6 of Fig. 14 is moved to its lower (Peak Distortion) position, and a reset push button S7 is momentarily depressed to clear any accumulated charge on capacitor C22. The peak distortion meter 43 is observed for a period of approximately two minutes, noting the maximum deflection of the meter during this time period. The meter should rise rapidly to peak readings and fall back slowly when operating correctly. The maximum deflection is the peak distortion in percent of an undistorted pulse of the trailing transition of the received signal pulse, since the phase switch 35 has remained in its previous position.

The switch 35 is now moved to its adjacent counter-clockwise position to read the leading transition of the received signal pulse, and the deflection of the meter is observed for approximately the same time as above. The peak fortuitous distortion is taken as the larger of the two readings.

While the invention has been described with respect to a particular embodiment thereof and in particular uses, it is to be understood that it is not limited thereto since many modifications and uses thereof will occur to those skilled in the art without departing from the spirit and scope of the invention as set forth in the appended claims.

What is claimed is:

1. Transmission test apparatus for measuring distortion which may occur in marking and spacing telegraph signal pulses during transmission over a circuit under test, comprising means in the transmitter portion of the apparatus for repeatedly transmitting over said circuit a test pattern of marking and spacing pulses, means in the receiver portion of the apparatus for selecting for measurement a predetermined one of said signal pulses from said test pattern received over said circuit, means in said receiver portion for producing a reference pulse whose area as measured by its length and amplitude is equal to one-half the area of an undistorted signal pulse as measured by its length and amplitude, means for comparing the area of said reference pulse with the area of either the leading portion or the trailing portion selectively of said received predetermined signal pulse to be measured, and means operative in the event that said compared areas are not equal to each other for indicating that distortion is present in the received signal pulse.

2. Apparatus according to claim 1, including means in the receiver portion for producing a gate pulse having a length equal to that of an undistorted signal pulse and phased to select either the leading or the trailing transition selectively of said received predetermined signal pulse to be measured, means for producing a coincidence pulse whose length equals the period of coincidence of said gate pulse and said received signal pulse, and means controlled in accordance with the length of said coincidence pulse for indicating whether distortion is present in said received signal pulse.

3. Apparatus according to claim 2, including an adjustable phase shifting network and a coacting phase switch operative in one position to shift the phase of said gate pulse to cause it to straddle the leading transition of the received predetermined signal pulse to be measured and operative in another position to shift the phase of the gate pulse to cause it to straddle the trailing transition of said received signal pulse.

4. Apparatus according to claim 2, including switching means in the transmitter portion for selecting any of a number of different test patterns of marking and spacing pulses for transmission over the circuit under test, and switching means in the receiver portion for selecting for measurement a particular signal pulse from any of the said test patterns received over said circuit.

5. Apparatus according to claim 4, including means for transmitting the test patterns at any of a plurality of different signaling speeds, and means controlled thereby for automatically adjusting the constants of the receiver portion to compensate for said different signaling speeds.

6. Ttransmission test apparatus for measuring distortion which may occur in marking and spacing telegraph signal pulses during transmission over a circuit under test, comprising means for repeatedly transmitting over said circuit a test pattern of marking and spacing pulses and means for selecting for measurement a predetermined one of the signal pulses from the repeated test pattern received over said circuit, means for producing a reference pulse having a length equal to that of an undistorted bias-free signal pulse and having an amplitude equal to one-half that of said undistorted pulse, means for producing a gate pulse having the same length as said reference pulse and means for selectively shifting said gate pulse to a position in which it selects either the leading or the trailing transition of said incoming predetermined signal pulse to be measured, a coincidence circuit having terminals to which said gate pulse and incoming signal pulse respectively are applied, said coincidence circuit producing an output pulse the length of which equals the period of coincidence of the gate pulse and the received predetermined signal pulse, a meter circuit having distortion indicating means, and means for applying said reference pulse and said coincidence output pulse to the meter circuit for causing the latter to indicate the nature and amount of distortion present in the received signal pulse.

7. Apparatus according to claim 6, in which said meter circuit comprises an integrating circuit having means for indicating fortuitous distortion, and means for applying said reference pulse and said coincidence output pulse to the meter circuit for causing the latter to indicate the nature and amount of fortuitous distortion present in the received signal pulse.

8. Apparatus according to claim 6, in which said meter circuit comprises a differential circuit having means for indicating characteristic distortion, and means for applying said reference pulse to one terminal of the meter circuit and said coincidence output pulse to another terminal of the meter circuit for causing the latter to indicate the nature and amount of characteristic distortion present in the received signal pulse.

9. Transmission test apparatus for measuring distortion which may occur in marking and spacing telegraph signal pulses during transmission over a circuit under test, comprising an adjustable oscillator in the transmitter portion of the apparatus for generating a sinusoidal current of predetermined frequency, means including a squaring amplifier circuit responsive to the sinusoidal output of said oscillator for producing a substantially square wave output, means comprising a differentiating amplifier circuit for producing from said square wave output a train of pulses of one polarity only, an electronic switching circuit controlled by said train of pulses, an electronic distributor having a plurality of stages each including a control electrode and an output electrode, said control electrodes being activated by said electronic switching circuit to cause said distributor output electrodes to be successively activated, and a signal pattern selector switch having switch banks permutably connected to said output electrodes of the electronic distributor, said selector switch being movable to different positions to select any of a number of different signal test patterns for transmission over the circuit under test.

10. Apparatus in accordance with claim 9, in which said oscillator comprises transistors in circuit with a frequency-determining network for generating sustained oscillations, and an amplifier comprising a transistor for stabilization and harmonic suppression, said frequency-determining circuit including switch means movable to different positions respectively for causing the oscillator to produce different frequencies whereby any given test pattern may be transmitted at a plurality of different signaling speeds.

11. Apparatus in accordance with claim 9, in which said electronic distributor comprises a beam switching tube having a plurality of stages each including a grid and a target electrode, said grids being activated by the electronic switching circuit to cause said target electrodes to be successively activated, the switch banks of said pattern selector switch being permutably connected to said target electrodes of the beam switching tube.

12. Apparatus in accordance with claim 9, in which said squaring and differentiating amplifier circuits essentialy comprise transistors, and said electronic switching circuit essentially comprises transistors interconnected to provide a flip-flop circuit whose output activates said control electrodes of the electronic distributor.

13. Apparatus in accordance with claim 9, including means for receiving any of said signal test patterns transmitted over the circuit under test, a phase shifter network and means for applying to the input of said network the sinusoidal output of said oscillator in the transmitter portion of the apparatus, means controlled by the output of said phase shifter network for producing a substantially square wave output, an electronic distributor having a plurality of stages each including a control electrode and an output electrode, means controlled by said square wave output for activating said control electrodes of the distributor to cause the distributor output electrodes to be successively activated, means including a phase switch for selecting a particular one of said output electrodes for producing a gate pulse and for selecting another of said output electrodes for producing a reference pulse, said phase shifter network being adjustable so as to time said gate pulse and enable said phase switch to select either the leading or the trailing transition of a particular incoming signal pattern pulse to be measured, a coincidence circuit jointly responsive to said gate pulse and said selected incoming signal pulse, said coincidence circuit producing an output pulse the length of which equals the period of coincidence of the gate pulse and the received signal pulse, a meter circuit having distortion indicating means, and means for applying said reference pulse and said coincidence pulse to the meter circuit for causing the latter to indicate the nature and amount of distortion present in the received signal pulse.

14. Transmission test apparatus for measuring distortion which may occur in marking and spacing telegraph signal pulses during transmission over a circuit under test, comprising means for receiving a signal test pattern transmitted over said circuit, a phase shifter network in the receiver portion of the apparatus, means for applying to the input of said network a sinusoidal current of exactly the same frequency as that of the pulses comprising said test pattern, means controlled by the output of said phase shifter network for producing a substantially square wave output, an electronic distributor having a plurality of stages each including a control electrode and an output electrode, means controlled by said square wave output for activating said control electrodes of the distributor to cause the distributor output electrodes to be successively activated, means including a phase switch for selecting a particular one of said output electrodes for producing a gate pulse and for selecting another of said output electrodes for producing a reference pulse, said phase shifter network being adjustable so as to time said gate pulse and enable said phase switch to select either the leading or the trailing transition of a particular incoming signal pattern pulse to be measured, a coincidence circuit jointly responsive to said gate pulse and said selected incoming signal pulse, said coincidence circuit producing an output pulse the length of which equals the period of coincidence of the gate pulse and the received signal pulse, a meter circuit having distortion indicating means, and means for applying said reference pulse and said coincidence pulse to the meter circuit for causing the latter to indicate the nature and amount of distortion present in the received signal pulse.

15. Apparatus in accordance with claim 14, in which said electronic distributor comprises a beam switching tube having a plurality of stages each including a grid and a target electrode, said grids being activated by the electronic switching circuit to cause the target electrodes to be successively activated, said phase switch having a bank of contacts respectively connected to said target electrodes for selecting a properly phased gate pulse and a bank of contacts respectively connected to said target electrodes for selecting a properly phased reference pulse.

16. Apparatus in accordance with claim 15, in which said gate pulse from the beam switching tube is a negative going pulse, a first transistor and a second transistor each normally biased to a nonconductive state, means for applying said gate pulse to said first transistor to cause it to conduct, said transistors being so interconnected whereby conduction of the first transistor causes the second transistor to conduct, and means for applying a negative going received signal pattern pulse to be measured to said second transistor to render it nonconductive and produce said coincidence pulse.

17. Apparatus in accordance with claim 15, in which said gate pulse from the beam switching tube is a negative going pulse, a PNP transistor normally biased to a nonconductive state, means for applying said gate pulse to the base of said transistor to cause it to conduct, an NPN transistor normally biased to its nonconductive state, said transistors being so interconnected as to cause the conduction of the PNP transistor to close the emitter circuit of the NPN transistor to a source of negative potential and cause the last named transistor to conduct, and means for applying a negative going received signal pattern pulse to be measured to the base of said last named transistor to render it nonconductive and produce said coincidence pulse.

18. Transmission test apparatus for measuring distortion which may occur in marking and spacing telegraph signal pulses during transmission over a circuit under test, comprising means for receiving a signal test pattern transmitted over said circuit, a phase shifter network in the receiver portion of the apparatus, means for applying to the input of said network a sinusoidal current of exactly the same frequency as that of the pulses comprising said test patern, a squaring amplifier circuit connected to the output of said phase shifter network for producing a substantially square wave output, means comprising a differentiating amplifier circuit for producing from said square wave output a train of pulses of one polarity only, an electronic switching circuit controlled by said train of pulses, an electronic distributor having a plurality of stages each including a control electrode and an output electrode, said control electrodes being activated by said electronic switching circuit to cause the distributor output electrodes to be successively activated, means including a phase switch for selecting a particular one of said output electrodes for producing a gate pulse and for selecting another of said output electrodes for producing a reference pulse, said phase shifter network being adjustable so as to time said gate pulse and enable said phase switch to select either the leading or the trailing transition of a particular incoming signal pattern pulse to be measured, a coincidence circuit jointly responsive to said gate pulse and said selected incoming signal pulse, said coincidence circuit producing an output pulse the length of which equals the period of coincidence of the gate pulse and the received signal pulse, a meter circuit having distortion indicating means, and means for applying said reference pulse and said coincidence output pulse to the meter circuit for causing the latter to indicate the nature and amount of distortion present in the received signal pulse.

References Cited in the file of this patent

UNITED STATES PATENTS

| | | |
|---|---|---|
| 1,609,383 | Shank | Dec. 7, 1926 |
| 1,628,392 | Cory | May 10, 1927 |
| 2,597,071 | Cory | May 20, 1952 |